Sept. 5, 1967  K. OBERLÄNDER ETAL  3,339,794
BAIL EARS FOR PORTABLE INSULATED CONTAINER
Filed Oct. 23, 1964  2 Sheets-Sheet 1
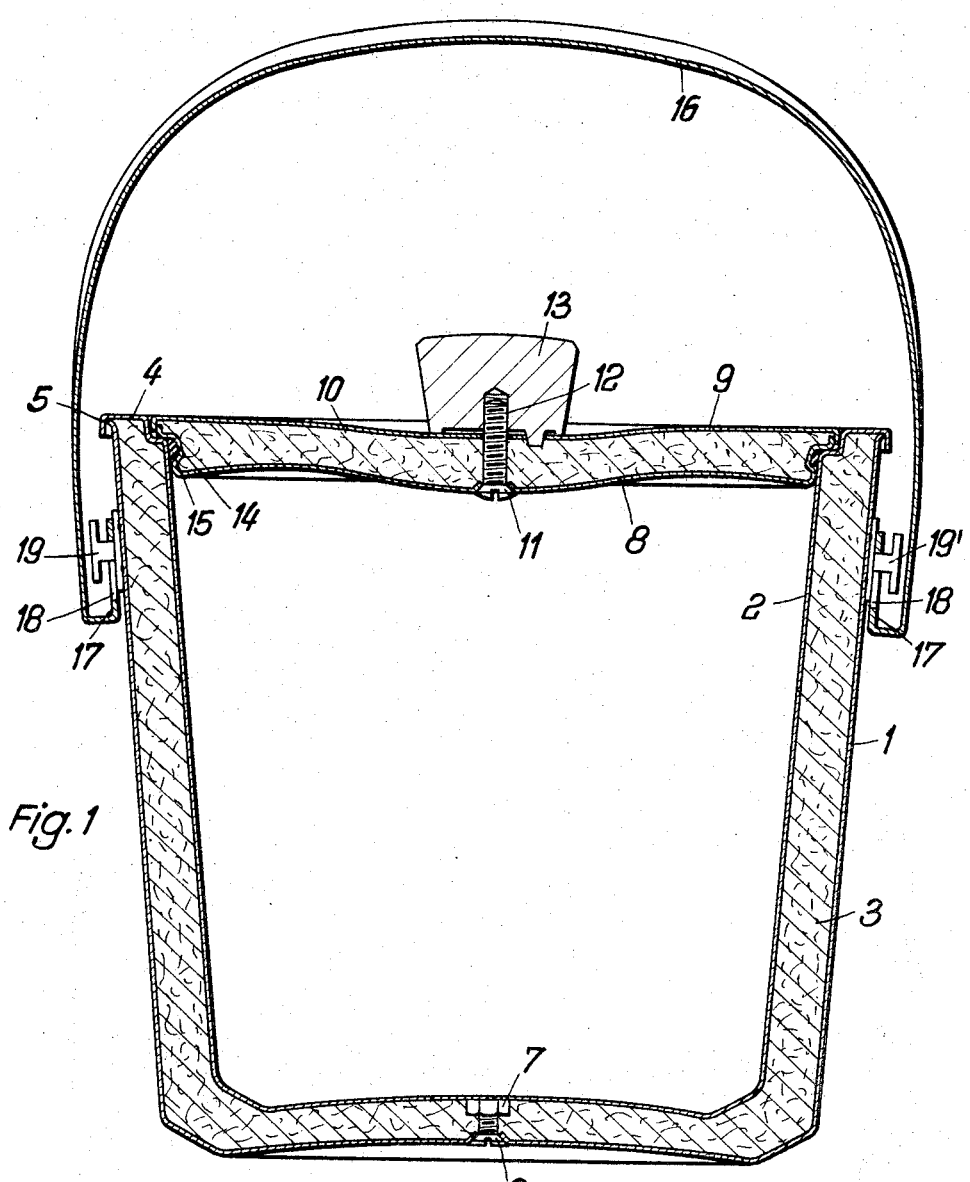
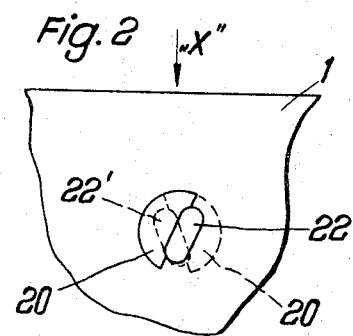
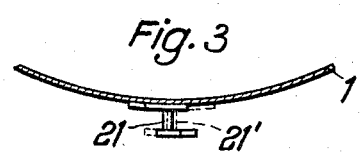
Inventors
Karl Oberländer
Kurt Radtke
By Watson, Cole, Grindle & Watson
Attys.

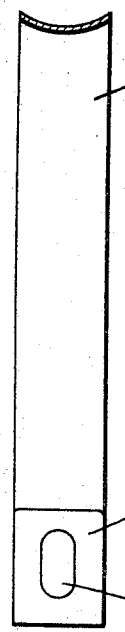
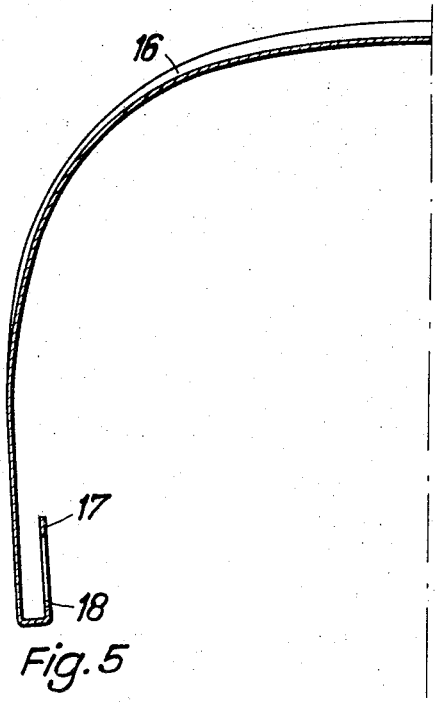
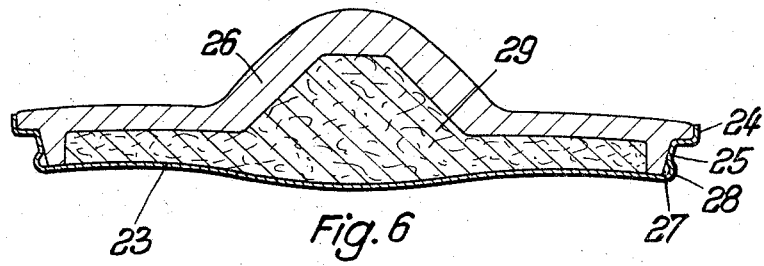
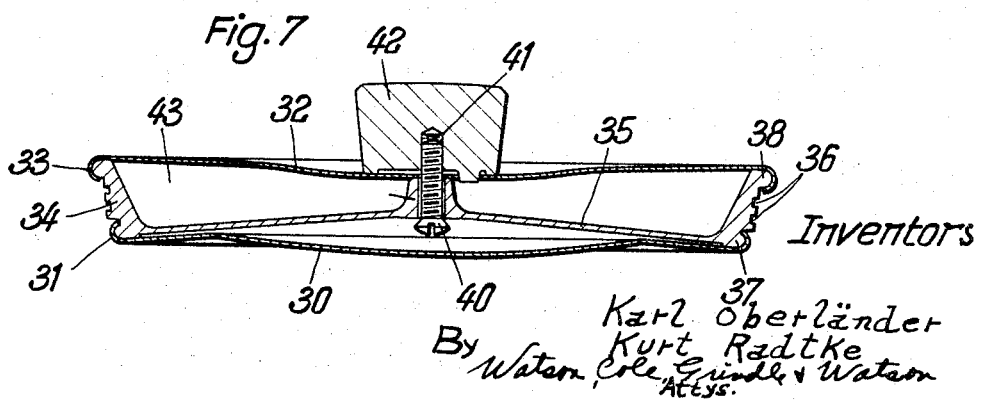
Inventors
Karl Oberländer
Kurt Radtke

United States Patent Office 3,339,794
Patented Sept. 5, 1967

3,339,794
BAIL EARS FOR PORTABLE INSULATED CONTAINER
Karl Oberländer, Geislingen, and Kurt Radtke, Munich, Germany, assignors to Wurttembergische Metallwarenfabrik, Geislingen (Steige), Germany
Filed Oct. 23, 1964, Ser. No. 406,009
Claims priority, application Germany, Oct. 26, 1963, W 31,452
3 Claims. (Cl. 220—91)

This invention relates to a portable insulating vessel which is provided with a removable cover and serves for holding foods or beverages which are to be kept hot or cold. Such an insulating vessel comprises, e.g., a double-walled pot or pail, in which the jacket space defined by the double shell and the double bottom is filled with a layer of thermally insulating material and the cover has a similar structure. A bail-shaped carrying handle is used for carrying this insulating vessel. Just as with a portable pail, this carrying handle is rotatably mounted on two opposite sides of the vessel.

In connection with such an insulating vessel, two problems must be solved, above all, which are significant for the manufacture and the practical use of the vessel. These problems concern the means for rotatably mounting the carrying handle on the casing of the vessel and the design of the insulating cover of the vessel. It is an object of the invention to solve both problems in a novel and advantageous manner.

According to the invention, the ends of the carrying handle are provided with elongated holes, which cooperate with suspension hooks secured on opposite sides of the shell of the vessel, which hooks have locking plates mounted on hook shafts and conforming to the internal contour of the elongated holes, said locking plates being oppositely inclined from the vertical center line of the vessel. The angles by which the locking plates are inclined from the vertical center line are preferably equal and opposite and may amount, e.g., to 25° to 60°.

With these means for rotatably mounting the carrying handle on the insulating vessel, the handle can easily be mounted and can be detached just as easily and is nevertheless locked against an undesired separation. When the insulating vessel rocks about the axis of rotation extending through the opposite suspension hooks, e.g., when the vessel is being carried, a simultaneous release of the carrying handle ends provided with the elongated holes by both locking plates is not possible because when one elongated hole is in registry with the associated locking bar, the other elongated hole will be inclined or transverse to the associated locking plate. Hence, the carrying handle could detach from the vessel only on one side but will remain connected to the vessel on the other side.

According to that aspect of the invention which relates to the cover of the vessel, the insulating cover comprises base and top parts, which enclose a hollow space, which is preferably filled with an insulating material, whereas the peripheral edge of the cover is provided with one or more grooves for receiving or forming annular seals therein.

The top and base parts of the cover of the vessel may consist of metal discs, which are held together by a screw-threaded element which may also serve for the fixation of a cover handle. Alternatively, a base part of metal may be connected to a top part of plastics. In both cases, the base part of the cover has an upturned lateral rim with an annular groove for receiving a sealing ring.

In a particularly simple embodiment, the cover of the vessel comprises a wheel-like central part of plastic, which has a sealing rim, which has metal discs secured to its top and bottom. The metal discs may have reversely bent rims, which embrace protruding annular beads of the plastic rim, which is provided with grooves and/or sealing rings at its periphery.

The pot- or pail-shaped body of the insulating vessel comprises a casing and a lining of metal, which are placed one in the other to define a space between them and which are held together according to another feature of the invention by a bottom screw-threaded element, which is tightened when an insulating filler has been inserted. This design of an insulating cover and insulating vessel body enables a simple and inexpensive manufacture.

The essential features of the invention are illustrated by way of example in various embodiments in the drawing.

FIG. 1 is a vertical sectional view showing an insulating vessel according to the invention.

FIG. 2 is an elevation showing a portion of a side wall of the vessel with one suspension hook, the opposite suspension hook being shown in dotted lines.

FIG. 3 is a broken-away top plan view showing the portion of the vessel illustrated in FIG. 2.

FIG. 4 is an interior front elevation showing the carrying handle.

FIG. 5 shows one half of the carrying handle in a sectional view taken through the central axis.

FIG. 6 is a vertical sectional view showing a second embodiment of the cover of the vessel.

FIG. 7 is a vertical sectional view showing a third embodiment of the cover of the vessel.

The pot- or pail-shaped body of the insulating vessel comprises a metal casing 1 and a metal liner 2, which are placed one in the other to define a space between them. This space is filled with insulating material 3, such as Styropor or foamed plastics. The liner has an outwardly reversely bent top rim 4, which with its extreme outer peripheral portion rests on the top rim 5 of the casing 1. The casing 1 and liner 2 are held together with the aid of a bolt 6, which is adapted to be screwed into a nut 7 secured to the bottom of the liner 2. The filler 3 is pre-formed in the required shape and inserted between the casing 1 and liner 2. It will then be sufficient to tighten the bolt 6 in order to hold the casing 1 and liner 2 firmly together.

The cover shown in FIG. 1 comprises a metal base part 8 and a metal top part 9, which are assembled so as to leave a space between them. This space is also filled with insulating material 10, such as foamed plastics or the like. The parts may be held together in a simple manner with the aid of a screw 11, which is screwed into the female screw threads 12 of a handle 13 consisting of plastic material or the like. A seal 15 of rubber or the like is inserted into an annular groove 14 of the upturned rim of the base part 8 of the cover.

The carrying handle consists of a preferably resilient handle 16, which has U-shaped inturned end portions 17 formed with elongated holes.

Two suspension hooks 19 and 19' are mounted on opposite sides of the casing 1 (FIG. 1) and serve for detachably mounting the carrying handle on the casing. According to the detail views shown in FIGS. 2 and 3, each suspension hook comprises a base 20 or 20', which is joined by soldering or spot-welding to the casing wall, a shaft 21 or 21', and a locking plate 22 or 22', which is carried by the shaft and conforms to the internal contour of the elongated hole 18. As is apparent from FIG. 2, the locking plates 22 and 22' are inclined in opposite directions from the center line of the vessel by preferably equal angles, e.g., of 25° to 60°.

To apply the carrying handle 16 to the insulating vessel, the handle is first mounted in a position in which it is inclined to one side and with its one elongated hole 18 is pushed over the one locking plate 22. Then the carrying handle is inclined to the other side and with its other elongated hole is pushed over the other locking plate 22′. The carrying handle 16 is now suspended on the suspension hooks 19 and 19′ and is locked against an unintended separation. The removal of the carrying handle is performed in the reverse order.

A second embodiment of the cover of the vessel is shown in FIG. 6. In this case the cover comprises a metal base part 23 having an upturned rim 24 and a groove 25 for receiving a seal 15, and a top part consisting of a plastic body 26. This plastic body 26 may be adhered into the rim 24 of the base part 23, as is shown in the left-hand half of FIG. 6, or it may be provided at its lower rim with a small annular bead 27, as is shown in the right-hand half of FIG. 6. When the plastic body 26 is forced into the base part 23, this bead 27 snaps into the correspondingly outwardly bulging lower annular bead 28 of the base part.

In this embodiment, the space between the metal base part 23 and the plastic body 26 may also be filled with insulating material 29. The plastic body 26 may be provided with a separate cover handle or is drawn together in the middle zone to form a flat grip portion.

A third embodiment of the cover of the vessel is shown in FIG. 7. A metal base disc 30 having an inturned rim 31 and a metal top disc 32 having an inturned rim 33 are connected by a plastic rim 34, which is carried by a plastic disc 35. At its outside periphery, the plastic rim 34 is provided with grooves 36, in which sealing rings are formed. The rim 34 has further upwardly and downwardly protruding annular beads 37 and 38, which are received by the inturned rims 31 and 33, respectively, of the metal discs 30 and 32. A screw 40 extends through a hub 39 of the disc 35 and is screwed into the female screw threads 41 of a plastic handle 42. In this embodiment, the screw 40 is covered by the metal disc 30. The space 43 between the metal top disc 32 and the plastic disc 35 may be filled with insulating material.

It will be understood that the illustrative embodiments of the features of the invention described hereinbefore may be varied and modified without departing from the scope of the invention. More particularly, the form of the insulating vessel may differ from the embodiment shown and the means for mounting the carrying handle may also be applied to other top- or pail-like or similar vessels, if desired.

What we claim is:

1. A portable insulating vessel, including a carrying handle, which is rotatably mounted on opposite sides of the wall of the vessel, in which the ends of the carrying handle are provided with elongated holes, which cooperate with suspension hooks secured on opposite sides of the shell of the vessel, which hooks have elongated locking plates mounted on hook shafts and conforming to the internal contour of the elongated holes, said locking plates having their longitudinal axes oppositely inclined from a plane passing through the suspension hooks and containing the vertical center line of the vessel.

2. A portable insulating vessel according to claim 1, in which each suspension hook consists of a base, a shaft projecting from the base and the locking plate on the shaft.

3. A portable insulating vessel according to claim 1, in which each suspension hook consists of a base, a shaft projecting from the base and the locking plate on the shaft, said base and locking plate being spaced from each other to provide a space for receiving the handle.

References Cited

UNITED STATES PATENTS

| | | | |
|---|---|---|---|
| 1,574,710 | 2/1926 | Spreen | 220—24 |
| 1,664,545 | 4/1928 | Geyer | 220—9 |
| 1,679,419 | 8/1928 | Geyer | 220—24 |
| 1,683,345 | 9/1928 | Geyer | 220—46 |
| 1,895,212 | 1/1933 | Smith | 220—15 |
| 2,071,810 | 2/1937 | Barnsteiner | 220—9 |
| 2,349,099 | 5/1944 | Kircher | 220—15 |
| 2,543,839 | 3/1951 | Faris | 220—9 |
| 2,602,564 | 7/1952 | Ziskin et al. | 220—15 |
| 2,690,853 | 10/1954 | Kircher | 220—15 |

FOREIGN PATENTS

| | | |
|---|---|---|
| 631,678 | 11/1961 | Canada. |
| 1,014,932 | 6/1952 | France. |
| 647,270 | 11/1961 | Germany. |

THERON E. CONDON, *Primary Examiner.*

JAMES R. GARRETT, *Examiner*